Figure 1:
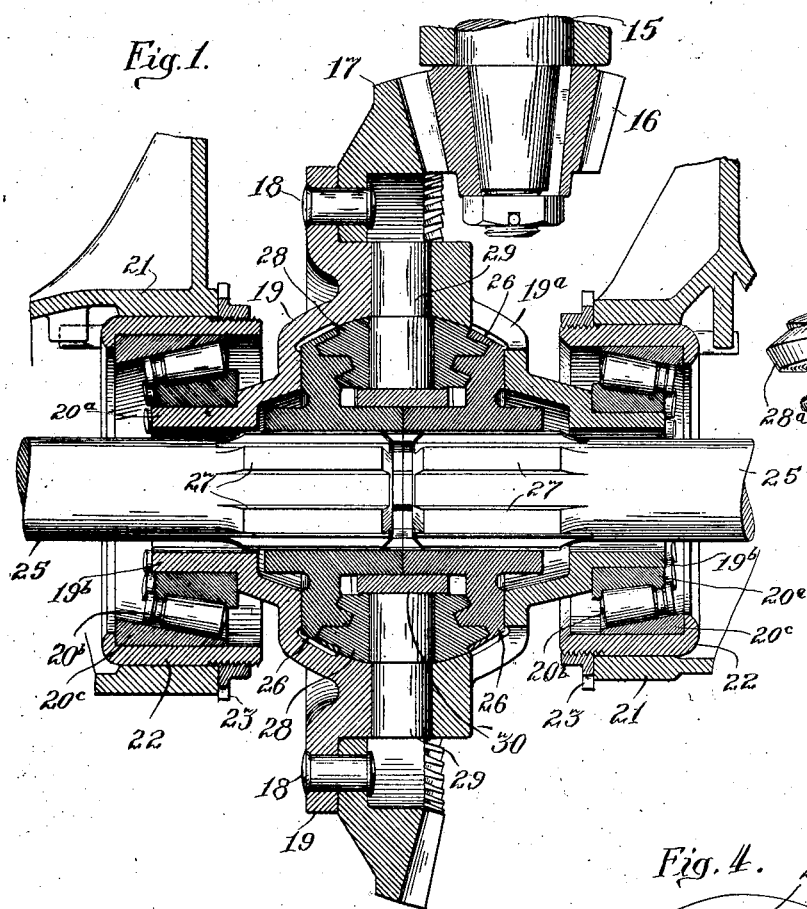

May 7, 1929.  L. H. SCURLOCK  1,711,546
DIFFERENTIAL MECHANISM
Filed Oct. 9, 1925  2 Sheets-Sheet 1

Inventor,
Lewis H. Scurlock
By Rector, Hibben, Davis & Macauley,
Attorney.

May 7, 1929.  L. H. SCURLOCK  1,711,546
DIFFERENTIAL MECHANISM
Filed Oct. 9, 1925  2 Sheets-Sheet 2
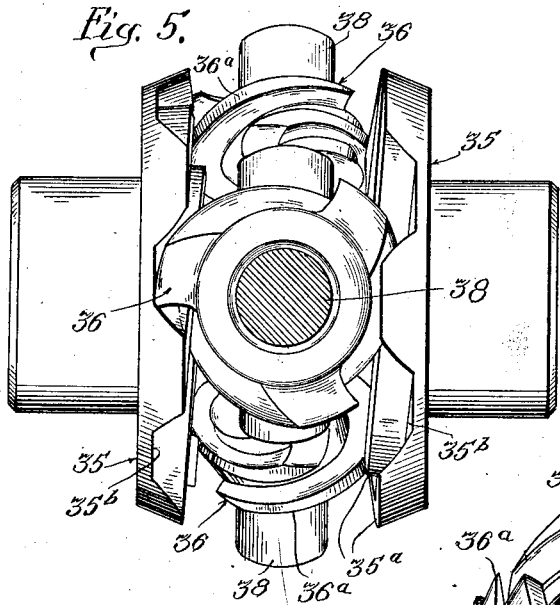
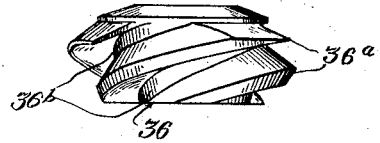
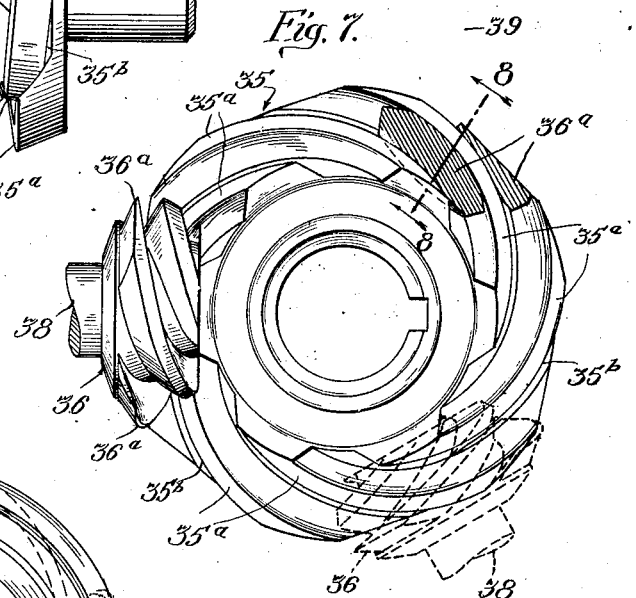
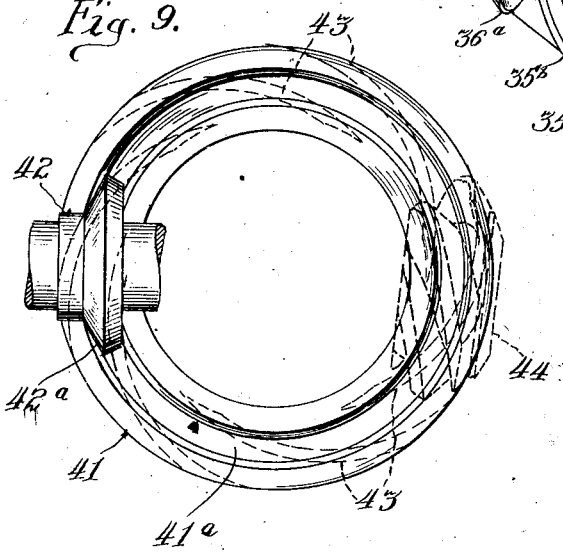
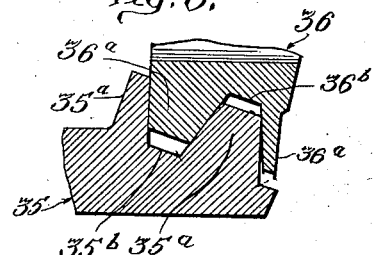

Patented May 7, 1929.

UNITED STATES PATENT OFFICE.

LEWIS H. SCURLOCK, OF CHICAGO, ILLINOIS, ASSIGNOR TO SCURLOCK GEAR CORPORATION, A CORPORATION OF NEW YORK.

DIFFERENTIAL MECHANISM.

Application filed October 9, 1925. Serial No. 61,415.

This invention relates to improvements in differential mechanisms adapted for use in transmitting power from a driving shaft to two other driven shafts or axle sections such, for example, as the axle sections of an automobile where it is desirable that the sections of the rear axle be capable of relative rotative movement to compensate for the differences in the path of travel of the rear wheels when turning corners and the like. It has been the common practice, heretofore, to employ differential gear mechanisms for transmitting power from the driving or transmission shaft of an automobile to the aligning sections of the rear axle, such gear mechanism comprising a ring gear driven from the transmission shaft and mounted on a pinion carrier provided with a plurality of compensating bevel pinions adapted to mesh with bevel gears secured to the ends of the axle sections. While such a construction has permitted differential action between the axle sections and the rear wheels of an automobile and the like, great difficulty has been encountered by reason of the tendency of the larger proportion of the speed to be transmitted to that wheel which encounters the least resistance on the road, so that if one wheel begins to slip in mud, for example, all of the driving force is imparted through the compensating pinions to the axle section driving the slipping wheel while no tractive effort is exerted through the other wheel of the automobile. An effort has heretofore been made to overcome this loss of tractive effort in the differential gear mechanism by providing the differential gears and pinions with inclined or curved teeth adapted to produce an end thrust of the pinions in one direction or the other against the end bearings of the pinions in the pinion carrier and housing, in the hope that the frictional resistance produced by this end thrust would so retard the rotation of the pinions under the influence of power transmitted from the transmission shaft that substantially equal amount of driving force would be imparted to both axle sections irrespective of the traction obtained by the driving wheels mounted on the axle sections. This attempted solution has not met with success because the limited frictional resistance has not been capable of producing any appreciable locking effect upon the compensating pinions but only a limited retarding effect. Many efforts have also been made to overcome the above mentioned loss of tractive effort by the use of irreversible forms of gearing. But these have resulted in constructions of great complexity, and, in many of them, though complete locking was obtained so that equal driving forces would be imparted to both axle sections, in many of them the differential action of the gearing was impaired or prevented.

The principal object of the present invention is to provide a differential mechanism which will be simple in construction, of the usual size and adapted to fit in the usual differential housings, and will not only give equal driving force to both axle sections in straight-away driving when there is equal traction on both wheels, and permit the necessary differential action occasioned by the different travel of the wheels, as in turning corners, but will also transmit equal driving force to both axle sections even though one wheel may have no traction with the road surface. This improved differential mechanism comprises differential power transmitting members which are secured on the axle sections in a manner similar to the arrangement of the usual differential gears and these differential members have an intermeshing engagement with rotatable compensating members which are mounted on a housing or carrier actuated from the engine driven transmission shaft, also in a manner similar to the usual arrangements. But the intermeshing engagement of the differential members and compensating members, is effected by means of teeth on the engaging members, which, instead of being directed in planes substantially parallel to the axes of the supporting shafts as are the teeth of the usual differential gears and pinions, and instead of being at only a slight angle thereto as in other proposed constructions, are directed in curved lines which at any point are at a material angle to those axes. This produces a gearing which, while reversible, is very inefficient as a means of transmitting power from the differential members through the compensating members and vice versa. It is upon this inefficiency, as gearing, that the present invention is based and that the advantageous results depend, as hereinafter set forth. The teeth are, also, of a form which is novel and contribute to the results attained.

The accompanying drawings illustrate two examples in which the invention may be embodied.

Figure 2:
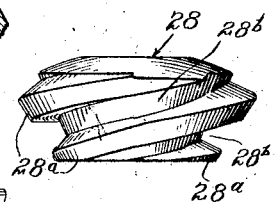
Figure 3:
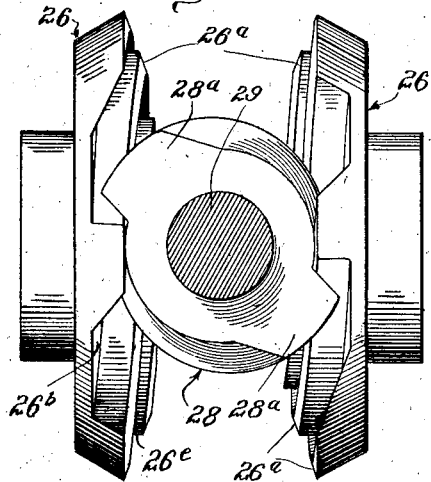
Figure 4:
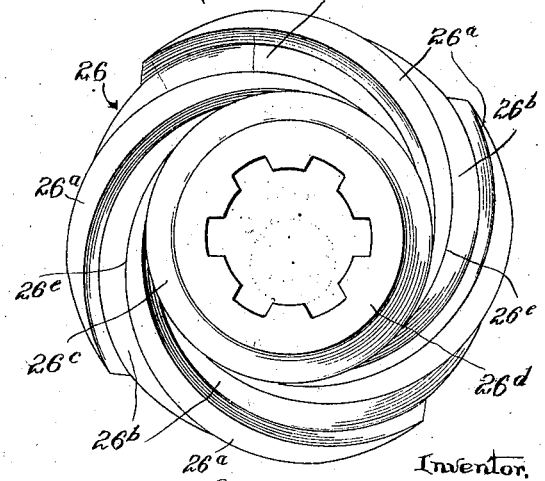

In the drawings Fig. 1 shows a horizontal transverse section through the rear axle housing of an automobile or other motor driven vehicle equipped with the differential mechanism of the present invention, the differential members, compensating members and adjacent parts being shown in axial section; Fig. 2 shows a side elevation of one of the compensating members; Fig. 3 shows a side elevation of the differential members secured on the axle sections together with an end elevation of one of the compensating members meshing therewith; Fig. 4 shows a plan view of the face side of one of the differential members, one being secured to each of the rear axle sections; Fig. 5 is an elevation similar to that of Fig. 3 showing the embodiment of the invention in differential members having a different number of teeth and embodying the use of an increased number of compensating members; Fig. 6 shows a side elevation of one of the compensating members of the structure illustrated in Fig. 5; Fig. 7 shows a plan view of one of the differential members embodied in the structure of Fig. 5, together with elevations of two of the compensating members, one of which is shown in dotted lines to illustrate the intermeshing engagement with the differential member secured to the rear axle, the third compensating member being shown in section; Fig. 8 shows a transverse section through the structure of Fig. 7 on the line 8—8 of that figure, showing the cross-section of the teeth or rack of the compensating members; and Fig. 9 shows a diagrammatic plan view of an illustrative model indicating the confined or circular movement of the compensating members with respect to the intermeshing rear axle differential members.

In Figs. 1, 2, 3 and 4 of the drawings, the invention is illustrated in connection with the differential mechanism comprising two compensating members 28, and two differential members 26, the latter being mounted on opposite ends of the axis of the axle sections 25, the teeth of one of the differential members being oppositely inclined with relation to those of the other differential member facing it. The driving power of the engine of the automobile or other vehicle is imparted to the rear axle through a transmission shaft 15 having mounted thereon a bevel pinion 16 which meshes with a ring gear 17 secured by rivets 18 on the one half of the rotatable carrier or housing 19—19ª similar to the usual pinion carrier of differential gear mechanism. This housing is shown as made in two parts which terminate in opposite sleeves or hubs 19ᵇ journaled in the roller bearings 20 carried by the rear axle housing 21. In the embodiment illustrated, each roller bearing comprises an inner bearing ring 20ª, a plurality of rollers 20ᵇ and an outer bearing ring 20ᶜ, the latter being secured within the annular retaining member 22 which is secured in adjusted position in the axle housings 21 by a threaded collar 23. Two aligning axle sections 25 are located within the axle housing 21 and extend into the rotatable housing or carrier 19—19ª. The rollers 20ᵇ are inclined with respect to the longitudinal axis of the axles 25 and the inner rings 20ª bear against shoulders on the lateral extensions 19ª of the rotatable housing or carrier so that this carrier is retained against longitudinal movement with respect to the power axles. The power axles 25 are connected in the usual manner to the supporting and driving wheels of the automobile or other vehicle, not illustrated.

The two differential members 26 face each other and are secured by splines 27 on the power axles 25 and have an intermeshing engagement with a plurality of compensating members 28 which are mounted within the carrier 19, being arranged to rotate on trunnions 29 which project radially inward from the outer wall of the housing or carrier and which are secured at their inner ends to an annular ring 30. The differential members 26 are provided with curved teeth 26ª separated by intervening curved spaces 26ᵇ and these mesh with oppositely inclined curved teeth 28ª which are formed on the compensating members 28 and separated from each other by the curved spaces 28ᵇ. Each of the differential members 26 is provided with a circular groove 26ᶜ around the hub 26ᵈ thereof and the spaces 26ᵇ between the teeth communicate with this circular groove 26ᶜ. The teeth 26ª and 28ª are formed on beveled faces of the differential members 26 and compensating members 28 respectively so that their outer faces 26ᵉ are inclined with respect to the axes of the supporting shafts of the members respectively, somewhat in the manner of the inclination of beveled gear teeth. The teeth themselves, of each of the members, are, however, directed at a large angle to the radii of those members and the spaces 26ᵇ and 28ᵇ between the teeth 26ª and 28ª, respectively are of the same width and cross-section throughout their length.

The spaces 26ᵇ in the differential members form a composite continuous pathway around the axis of each member 26 for the travel of the teeth of the compensating members 28 when a differential action takes place due to the different travel of the wheels of the vehicle as hereinafter pointed out, this continuous pathway being provided by reason of the fact that the spaces 26ᵇ substantially overlap so that when one of the teeth 28ª of a compensating member 28 reaches the end of one of the spaces 26ᵇ, another tooth 28ª of the member 28 engages in another one of the spaces 26ᵇ. Each tooth has a length several times greater than its circumferential width. The compensating members 28 are shown as cut from beveled blanks of such formation that the axes of the trunnions 29 are located at right angles to the axes of the axle sections 25. The teeth 28ª of the compensating members 28 are of the same length as the teeth of the differential members 26. The number of teeth employed may vary, depending upon the number of compensating members which are employed. In the embodiment illustrated in Figs. 1 to 4 inclusive, two compensating members are employed, each having two teeth, while the differential members 26 mounted on the axle sections each have four teeth. The number of teeth on the differential members may be any multiple of the number of compensating scrolls which are employed.

Thus in Figs. 5 and 7 of the drawings, there is illustrated an arrangement of differential mechanism in which three compensating members 36 are employed, each having three teeth, the differential members 35 having six teeth. It is to be noted that with such a low angle between each tooth and a tangent to the circumferential, a very small number of teeth is required to furnish the needed intermeshing action between the gears of a pair. However, the efficiency of the differential merely as gearing is reduced.

The cross-section of Fig. 8 shows the cross-sectional form of one of the spaces 35ᵇ between the teeth 35ª, which is also the cross-sectional form of the spaces between the teeth 26ª of Figs. 1 to 4.

As shown in Fig. 8, the tooth 36ª of the compensating scroll contacts substantially throughout its depth with the adjacent face of the tooth 35ª of the differential member 35, whereas in the meshing of ordinary gear teeth, there is a rolling or line contact only. The teeth are symmetrical at all points with respect to the elements of the cones formed by the bottoms of the spaces between the teeth and the opposite base angles are equal, as Fig. 8 clearly shows. The tooth faces are rack-like, being along straight lines in a radial section like Fig. 8. Two teeth on two of the intermeshing gears, therefore, engage each other at all times along a straight line across the curved tooth faces. On account of this shape of the intermeshing teeth, the wearing surfaces wear equally from top to base, and they retain their straight line profile after any amount of wear. In this they differ from any other type of bevel gearing, because intermeshing teeth that have two convex profiles in wearing contact will wear small flat profile surfaces on each other which become larger and larger with continued wear. Thus a varying outline is produced and they will not cooperate uniformly. Also the teeth of this differential present comparatively wide bearing surfaces to each other all the time so that a much slower wearing of the surfaces results.

Furthermore, the curvature of the teeth is so great that they overlap each other in succession around the circumference of each gear. Also at least two teeth of each gear are in contact with two teeth of a gear of the other set at all times. This is shown in Fig. 8 and also in Fig. 1. This distributes the friction, wear and heating. The teeth of the differential members are, preferably, of the same width as the teeth of the compensating members and the differential members are preferably much larger in diameter than the compensating members.

If, now, we assume that a vehicle equipped with the differential gearing of this invention is being driven straightaway with equal traction between each of the wheels and the surface of the road, the power of the engine will act through bevel pinion 16 to drive the bevel ring-gear 17 secured to the rotatable housing carrying the compensating members 28 (Figs. 1 to 3) or 36 (Figs. 5 to 7). As the teeth on the differential members, 26 or 35, are oppositely inclined, as they face each other, any tendency of a compensating member to rotate on its own axis in one direction due to its engagement with one differential member, is balanced by its tendency to rotate on its own axis in the other direction due to its engagement with the other differential member. Therefore, the result, just as in the case of the ordinary bevel differential gearing, is that the compensating members do not rotate on their own axes but are carried bodily around by their rotating housing and drive each of the differential members attached to the axle sections and wheels, as though all the parts were locked together.

The parts are, indeed, locked together under the foregoing conditions. This is due to the fact that the teeth of the differential and compensating members lie in paths which are at a wide angle to the radii of such members, respectively. If the teeth lay in paths which were exactly transverse, that is, at right angles to those radii as illustrated in full lines in Fig. 9, the space 41ª between the teeth in the differential member 42 would be concentric with the axis of that member, and the tooth 42ª in the compensating member 42 would be concentric with the axis of that member. In this case, the two members would not be geared together at all. If, however, the teeth are placed on the differential member not at right angles to the radii of that member, but at a slight departure from said right angle, as indicated by dotted lines 43 (with correspondingly inclined teeth on the compensating member as indicated also in dotted lines) there will be a gear engagement. But the gearing is a very inefficient one as the force exerted by the teeth of either one of the members upon the teeth of the other may be resolved into two components, one in a line with the axis of such member and the other, by far the smaller component, in a plane at right angles to the axis, so that there is but little turning force. That is, the force is exerted as between wedge surfaces, the teeth of one member acting as one element of the wedge and the teeth of the coacting member acting as the other element. As the angle of the wedge is small, the pressure between the meeting wedge surfaces becomes very large even when a comparatively small force is exerted in a plane transverse to the axis, and the friction between the meeting surfaces of the teeth locks them together. The bringing about of this final result is materially assisted by the form of the teeth providing extended meeting surfaces as explained in connection with Fig. 8.

If the vehicle now comes to a curve so that the outer wheel of the vehicle, as it goes around the curve, tends to revolve faster than the inner wheel, such faster revolution is permitted by reason of such faster revolving wheel moving the differential member attached to its axle section at a speed greater than that at which the other differential member is moving, such movement, unlocking, to the extent of that movement, the compensating members and allowing them to turn, to that extent, on their own axes. That is, the faster moving differential member not only removes, in such movement, its retarding engagement with, and consequent opposition to the rotation of, the compensating pinions on their own axes due to their engagement with the more slowly moving differential member on the other axle section, but, also may even tend to drive the compensating members.

Now, assume that one wheel of the vehicle has good traction with the road surface and the other has poor traction as is the case when such wheel is in soft mud or snow, or, due to unevenness in the road surface, has no traction at all but is momentarily out of contact with the road surface. Under such circumstances, driving forces will be imparted to both wheels and such driving forces will be equal on each wheel if the invention is utilized in its best form and to its highest degree. That is, the locking action takes place between the inclined teeth of one member and the co-acting inclined teeth of another member, as described above. The locking is obtained solely by the action of the teeth of the gears on each other. This is not to say, however, that no wear takes place on the gear casing at the larger ends of the compensating members. Such wear takes place in all differential gearing. I do not depend on it for the locking action.

When such locking occurs, the present invention is used in its most effective manner, as then the driving force of the engine will be applied to both wheels equally even though one is free to slip; but its advantages may be secured, though in lesser degree, a larger or smaller portion of the driving force being applied to the wheel having good traction, even if no locking takes place. If the angle of inclination of the teeth to the radii of the member on which they are placed is only slightly less than 90°, the locking occurs most readily but, with only such slight deviation from 90°, the differentiating action in turning corners becomes somewhat difficult. The locking occurs even if the departure from 90° is considerable, and with such departure, the differentiating action in turning corners is readily effected. As the departure from 90° is made greater still absolute locking may not occur, but a considerable amount of driving force may still be imparted to the wheel having good traction on the road surfaces. It is impossible to state the exact angles of inclination of the teeth to produce one or another of these effects, as they will necessarily differ with different materials used in making the gears and with differing perfection of manufacture of the various parts. I have, however, found by actual use that an angle of 76° is very effective to produce the desired locking and to permit ready differential action with the particular structures that I have employed, and that, with teeth at an angle of less than 70° no absolute locking occurs in those particular structures. In its locking action, the gearing produces an effect like that produced by an irreversible gearing, though it is not such in fact.

An important feature of the invention is that the interlocking and compensating features are obtained by the use of differential mechanism which differs from the ordinary differential gear mechanism in the formation of the differential members themselves so that the differential gearing of the present invention may be interchanged with or used to replace the differential gears heretofore used in the rear axle mechanism of automobiles with a gear case of the same size and shape. A further advantage is that the improved differential and compensating members of the present invention may be constructed with a very small number of teeth as compared with the number of gear teeth formed on the differential gears heretofore employed. I prefer to cut the teeth on the lines of an Archimedes spiral.

Although I have illustrated and described only two forms of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. A differential comprising two sets of intermeshing bevel gears comprising two opposite gears, said bevel gears having curved flat sided teeth of uniform section, the teeth being located at such large angles from radial lines, that, when materially unequal resistances are encountered by the two opposite gears of the differential, the other members of the differential will be compelled to stop turning on their own axes and act as wedges against the teeth of the opposite gears and lose their efficiency as gearing, thereby transmitting rotary motion to the side gear encountering the greater resistance.

2. The combination in a differential, of intermeshing bevel gears having their axes at an angle to each other, and provided with curved teeth with the surfaces which bear on each other straight in profile throughout their pressure surfaces.

3. The combination in a differential, of intermeshing bevel gears having their axes at an angle to each other, and provided with curved teeth which, in a section taken on a radial plane, are straight sided and in the form of a rack with the tops of the teeth at an inclination to the plane of the bottoms of the spaces between them.

LEWIS H. SCURLOCK.